United States Patent
Maes et al.

(10) Patent No.: US 6,700,994 B2
(45) Date of Patent: *Mar. 2, 2004

(54) EMBEDDING AND DETECTING A WATERMARK IN IMAGES

(75) Inventors: Maurice J. J. J-B. Maes, Eindhoven (NL); Cornelis W. A. M. Van Overveld, Eindhoven (NL); Peter M. J. Rongen, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 591 days.

This patent is subject to a terminal disclaimer.

(21) Appl. No.: 09/765,681

(22) Filed: Jan. 19, 2001

(65) Prior Publication Data

US 2001/0002931 A1 Jun. 7, 2001

Related U.S. Application Data

(63) Continuation-in-part of application No. 09/226,532, filed on Jan. 7, 1999, now Pat. No. 6,198,832.

(30) Foreign Application Priority Data

Jan. 9, 1998 (EP) ............................................. 98200034

(51) Int. Cl.[7] ................................................ G06K 9/00
(52) U.S. Cl. ....................... 382/100; 382/232; 382/215; 380/54; 713/176
(58) Field of Search ................................. 382/100, 254, 382/105, 215; 713/200, 176; 345/614, 21; 702/191; 348/14.12, 14.13; 380/218, 54.22, 22, 21, 230, 246; 707/104.1; D14/160; 369/13.02, 13.07, 13.14

(56) References Cited

U.S. PATENT DOCUMENTS

| 5,721,788 | A |   | 2/1998 | Powell et al. ................ 382/100 |
| 5,809,160 | A |   | 9/1998 | Powell et al. ................ 382/100 |
| 5,933,798 | A |   | 8/1999 | Linnartz ...................... 702/191 |
| 5,960,081 | A | * | 9/1999 | Vynne et al. ................ 713/176 |
| 6,400,826 | B1 | * | 6/2002 | Chen et al. .................. 382/100 |
| 6,557,103 | B1 | * | 4/2003 | Boncelet et al. ............. 713/176 |

FOREIGN PATENT DOCUMENTS

| EP | 0581317 | 2/1994 | ............ G07D/7/00 |
| WO | WO9625005 | 8/1996 | ............ H04N/7/08 |
| WO | WO9803014 | 1/1998 | ............ H04N/7/08 |
| WO | WO9935836 | 7/1999 | .......... H04N/5/913 |

OTHER PUBLICATIONS

"Digital Watermarking by Geometric Warping", M.J.J.J–B. Maes & C.W.A.M. van Overveld, Proceedings 1998 International Conference on Image Processing, vol. 2, 1998.

* cited by examiner

Primary Examiner—Jayanti K. Patel
Assistant Examiner—Barry Choobin (57) ABSTRACT

A digital image signal is watermarked by locally changing geometric features of the image. The watermark consists of a pseudo-random, dense subset of image pixels, e.g., a pattern of lines (20). A number of significant image pixels (21,22,23), i.e., pixels which give the highest response to a predetermined processing operation, is determined and then moved (24) to the vicinity (δ) of the line pattern. As a result of this "warping", the majority of significant image pixels (21,22) is eventually located within the vicinity of the line pattern. At the receiver end, the most significant pixels of an input image are again determined. The image is a watermarked image if a statistically high percentage lies within the vicinity of the line pattern.

20 Claims, 5 Drawing Sheets

EMBEDDING AND DETECTING A WATERMARK IN IMAGES

CROSS-REFERENCE TO RELATED APPLICATIONS

This is a continuation-in-part of U.S. patent application Ser. No. 09/226,532, filed Jan. 7, 1999 now U.S. Pat. No. 6,198,832.

BACKGROUND OF THE INVENTION

1. Field of the Invention

The invention relates to a method and arrangement for embedding a watermark in an image. The invention also relates to a method and arrangement for detecting a watermark in an image. The invention further relates to a method and arrangement for transmitting and receiving an image containing a watermark. Furthermore, the invention relates to a method and arrangement for recording an image containing a watermark onto a storage medium, and a method and arrangement for playing back an image containing a watermark from a storage medium. The expression "image" is understood to mean still images as well as video.

Digital watermarking is a technique used to certify the ownership of digital image or video contents. By imperceivably hiding such ownership information into digital content, it becomes possible to prevent piracy and illegal use of this content. Typical applications of watermarking include copy-protection of digital video and broadcast monitoring.

2. Description of the Related Art

Most presently used techniques for watermarking digital images boil down to adding a pseudo-noise watermark pattern to an image. This addition may take place in the pixel domain or the frequency domain. Effectively, it means that luminance and/or color components of the watermarked image are slightly different from the original. The detection of a watermark is done by correlating the suspect image with the watermark pattern to be detected. Such a prior art method is disclosed, inter alia, in International Patent Application WO-A-98/03014, corresponding to U.S. Pat. No. 5,933,798.

A watermarking method must fulfill a number of basic requirements. Adding the watermark pattern may not affect the visual appearance of the image. There should be many different watermark patterns, since every copyright holder should have at least one distinct watermark. Detection of the watermark must be possible without using the original image. The detection must be fast so as to be able to detect watermarks in video, or to scan the World Wide Web for watermarked images. It should not be easy for attackers to remove the watermark. The method must further be robust to transformations or operations that can be applied to images or video, such as, color transformations, geometric transformations, such as, scaling, translation or rotation, data compression, such as, JPEG/MPEG, noise, embedding of other watermarks, gray scaling, image smoothing, dedicated transformations, A/D and D/A conversions, PAL/NTSC conversions, etc.

The above requirements are conflicting, and there are no methods known that fully satisfy all requirements. Many methods can easily be hacked by attackers who have a number of watermarked images at their disposal. Since detection is based on correlation (which is a linear operation), an attacker needs only a good estimate of the watermark, and he can use this to subtract the guessed watermark from images in order to mislead detection. Simple geometric transformations such as rotations or scaling can only be dealt with at the expense of considerable computing times during detection. It is also difficult to ensure sufficient variation of watermarks. The number of bits that can be embedded using one correlation is limited.

SUMMARY OF THE INVENTION

It is an object of the invention to provide a method and arrangement for embedding a watermark which alleviates the above mentioned drawbacks.

To this end, the invention provides a method of embedding a watermark in an image, comprising the steps of identifying a given number of most significant image pixels; defining a watermark in the form of a pattern of pixels; and locally warping the image so as to move a significant percentage of the most significant image pixels to the vicinity of the watermark pattern.

The corresponding method of detecting the watermark comprises the steps of identifying a given number of most significant image pixels; determining the distances of said most significant image pixels to the watermark pattern; and generating a detection signal indicating that said predetermined watermark is embedded in the suspect image, if the average distance of said most significant pixels to the watermark pattern is significantly smaller than the average distance of all image pixels to the watermark pattern.

The watermark is thus embedded by slightly changing geometric features of the image instead of changing luminance or color components. This makes removal of the watermark a complex task because it requires image dependent processing, in contrast with simply subtracting an estimated watermark from the image, which works for all images in most current methods. The method is also more robust against geometric transformations such as scaling and rotations, because detection can be done in a shorter time. Further, the method allows a sufficient variation of watermark patterns to be used. Checking a suspect image against many different watermark patterns is computationally a drastic improvement over current methods.

BRIEF DESCRIPTION OF THE DRAWINGS

With the above and additional objects and advantages in mind as will hereinafter appear, the subject invention will be described with reference to the accompanying drawings, in which.

DESCRIPTION OF THE PREFERRED EMBODIMENTS

Figure 1:
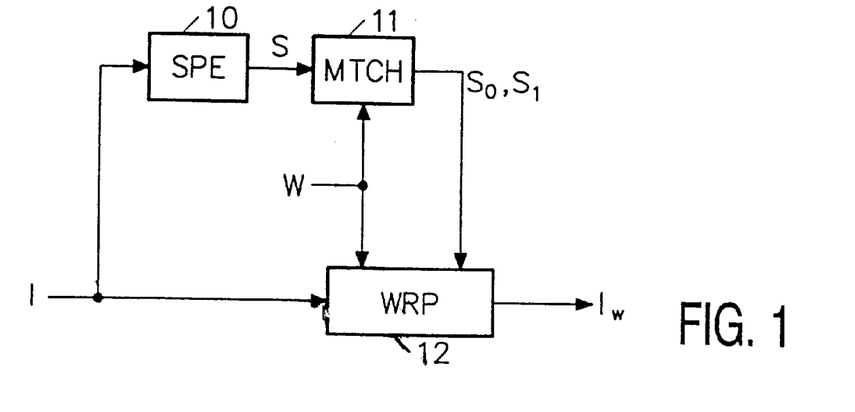
FIG. 1 shows, schematically, an arrangement for embedding a watermark in an image in accordance with the invention.

FIG. 1 shows an embodiment of an arrangement for embedding a watermark W in an image I in accordance with the invention. The arrangement comprises a salient point extraction module 10, a matching module 11, and a warping module 12. The arrangement receives an input image I and a watermark W.

Figure 2:
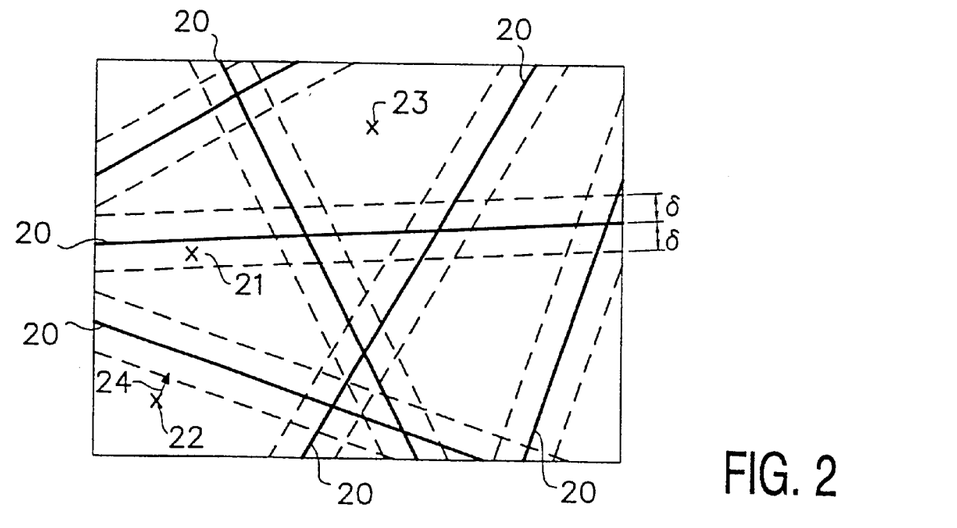
FIGS. 2, 3A and 3B show images illustrating the operation of the arrangement shown in FIG. 1.

FIG. 2 shows an example of the watermark W. It is assumed to be a pattern of lines 20, but this is not essential. A pixel is said to lie "on the watermark", or "in the vicinity of the watermark", if the distance from that pixel to the nearest line 20 is less than a threshold value δ. In accordance herewith, pixel 21 lies on the watermark, whereas pixels 22 and 23 do not. In this embodiment, the watermark is dense. This is understood to mean that a significant percentage of the image pixels (for instance, p=50%) lies in the vicinity of one of the lines.

The salient point extraction module 10 identifies a fixed number K of most significant pixels (hereinafter also referred to as most salient points or salient points for short) of the input image I. Salient points can be, inter alia, the pixels giving the highest response to an edge-detect filter, but there are many other ways of finding significant points. Other examples of significant points are corners of edges, or local maxima or local minima. The saliency of pixels may be derived from the luminance of pixels, the chrominance, or both.

Visual artifacts may occur in the watermarking method if the significant points are located closely together. To avoid this, the image may be subdivided into blocks, and one or a few significant points per block are chosen unless there is no variation in the image pixels within the block.

The salient points constitute a set S of image pixels. This set of pixels is applied to the matching module 11, which matches the salient points with the watermark and identifies a set $S_1$ of salient points that lie on the watermark W, and a set $S_0$ of salient points that does not.

The sets $S_0$ and $S_1$ of salient points are applied to the warping module 12. This module introduces small, local, geometrical changes to the image such that a significant high percentage of pixels from the set S is moved to the vicinity of lines. This is illustrated in FIG. 2 by an arrow 24 which denotes that pixel 22 has been moved to a line of the watermark. The thus warped image $I_W$ constitutes the image with embedded watermark. The geometric changes introduced by warping affect neighborhoods of the pixels of S in a smooth way, such that at some distance of a given pixel the geometric change decays to zero. The warping algorithm is preferably such that it does not create too many new significant points. The direction into which a point is warped should be adapted to local image features, such that it does not introduce visual artifacts.

Figure 3A:
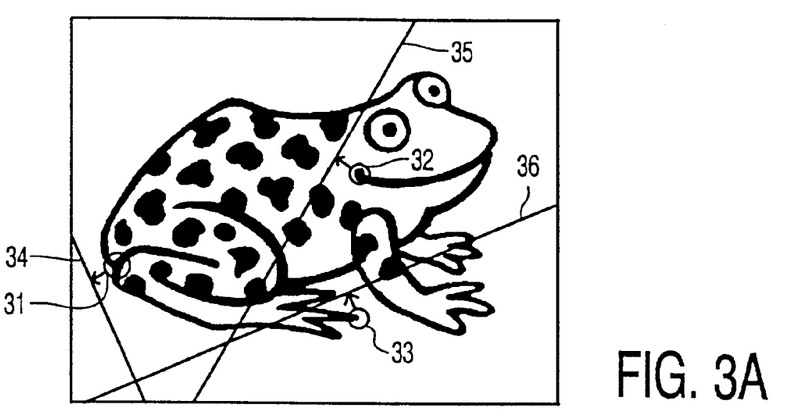
Figure 3B:
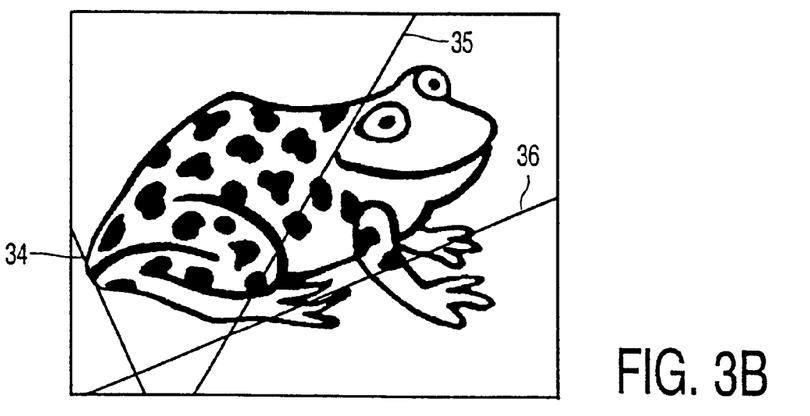

Warping is well-known in the field of photo processing. FIGS. 3A and 3B have been made with a commercially available PC software package for photo editing. FIG. 3A shows an original image with salient points 31, 32, 33, and watermark pattern lines 34, 35, 36. FIG. 3B shows the watermarked image in which the salient pixels have been warped to the nearest line (for clarity shown in an exaggerated manner).

In a practical experiment, an image was found to have 1014 significant points, 541 of which (53%) were located in the vicinity of the line pattern. Out of the 473 points not lying on the watermark, 354 points were warped, so that 895 salient points (88%) of the image were located in the vicinity of the pattern after watermarking.

Figure 4:
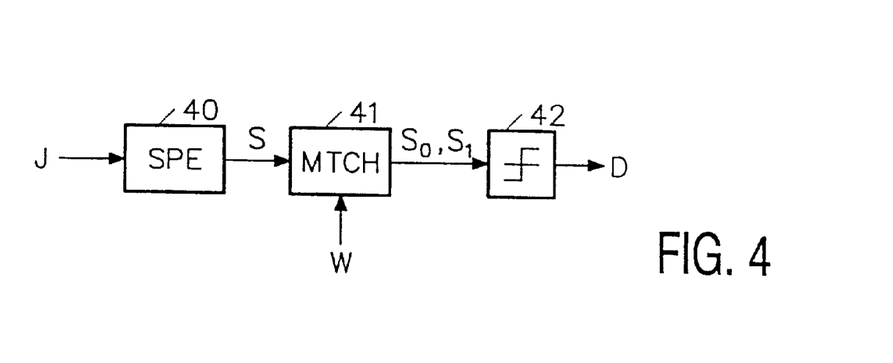
FIG. 4 shows, schematically, a first embodiment of an arrangement for detecting a watermark in an image in accordance with the invention.

FIG. 4 shows a first embodiment of an arrangement for detecting the watermark W in an image J in accordance with the invention. The arrangement comprises a salient point extraction module 40 which is identical to module 10 in FIG. 1, a matching module 41 which is identical to module 11 in FIG. 1, and a decision module 42. The arrangement receives a suspect input image J and the watermark W whose presence in the input image J is to be checked. The operation of the arrangement will be obvious in view of the description of the embedder described above. The salient point extraction module 41 determines the set S of most significant pixels in the suspect image by the same method as used in embedding. The matching module 42 matches the salient points with the watermark line pattern. The detection module 43 detects whether a statistically significantly high percentage of the salient points lies within the vicinity of the line pattern (set $S_1$). If that is the case, the watermark is present and a detection signal D=1 is generated, otherwise it is not (D=0).

In the embodiment of the embedder described above (in which the watermark pattern covers 50% of the image pixels), the watermark is detected if substantially more than 50% of the salient points of the suspect image lie on the line pattern. In the practical experiment mentioned before, 708 out of 1014 salient points of the watermarked image (70%) were found to lie on the pattern. Note that the number of salient points in the watermarked image can differ from the number of salient points in the original image, because the warping process may affect the "saliency" of pixels.

Figure 5:
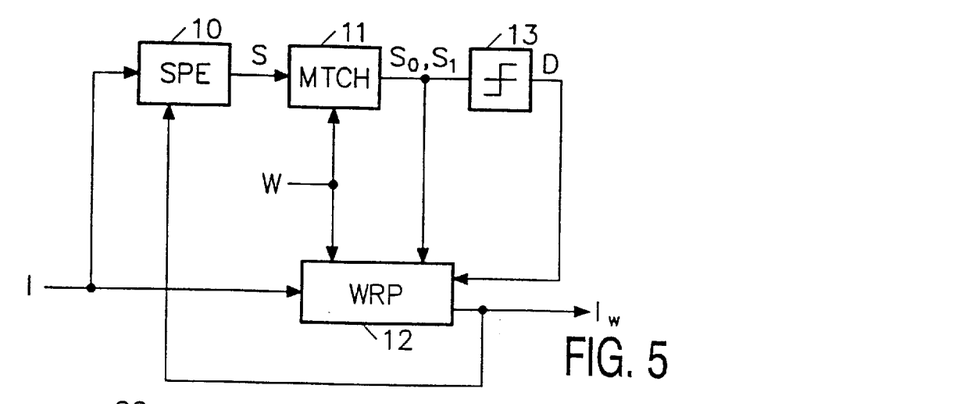
FIG. 5 shows a further embodiment of an arrangement for embedding a watermark in an image.

FIG. 5 shows a further embodiment of the arrangement for embedding the watermark. The embodiment differs from the arrangement shown in FIG. 1 in that the embedder comprises a detection module 13 which is identical to module 42 in FIG. 4. Thus, the embedder now includes the watermark detector. The detection module 13 applies the detection signal D to the warping circuit 12. Further, the warped image $I_W$ is fed back to the salient point extraction module 10. The arrangement shown in FIG. 4 embeds the watermark in an iterative sequence of steps. Initially, only a restricted number of salient points of the input image I is warped. The watermarked image $I_W$ is subsequently fed back to undergo "harder" embedding until the detection module 13 decides that the amount of warping is sufficient. Every time, those pixels are selected for which warping has the least artifacts, for example, the pixels lying nearest to a line. Exaggerated warping of pixels, such as pixel 23 in FIG. 2, can thus be avoided.

In the embodiments for embedding and detecting a watermark described above, salient pixels are warped such that they lie on the watermark (cf. pixel 22 in FIG. 2). More generally, the closeness to the line pattern is controlled. Instead of simply counting how many points are actually within the vicinity δ of the line pattern, detection can also be based on the average distance between significant points and the line pattern. The corresponding process of embedding is based on changing said average distance.

Figure 6A:
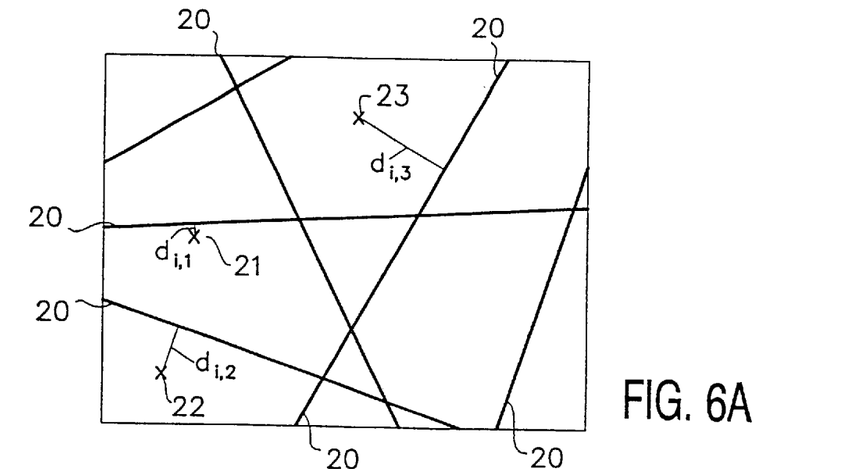
FIGS. 6A–6B show images of a watermark illustrating the operation of more general arrangements for embedding and detecting a watermark in accordance with the invention.
Figure 6B:
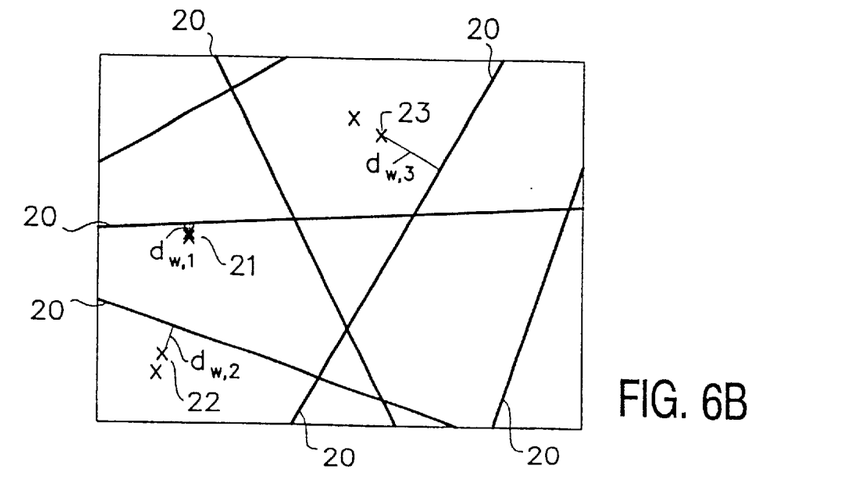

The operation of such a more general arrangement will now be described with reference to FIGS. 6A and 6B. FIG. 6A shows the same pattern of lines 20 and salient image pixels 21–23 as shown in FIG. 2. The lines 20 no longer have the "thickness" 2δ. The distance from the salient pixels 21, 22, and 23 to the nearest line is denoted $d_{i,1}$, $d_{i,2}$, and $d_{i,3}$, respectively, where the index i indicates that the distance relates to pixels of the input image. FIG. 6B shows the pattern and image pixels after watermarking. The salient pixels 21–23 have been warped such that their respective distances to the nearest line 20 are changed (decreased or increased). Not all pixels need to be warped. Neither need the pixels to be warped by the same distance or factor. In FIG. 6B, the distances after warping are denoted $d_{w,1}$, $d_{w,2}$, and $d_{w,3}$, respectively.

Before describing the operation of an embedder and detector in accordance with this embodiment, it is noted that the average distance $\bar{d}_1$ of the salient points (the set S) of an unwatermarked image, i.e., $$\bar{d}_i = \frac{1}{K} \sum_{k \in S} d_{i,k} \qquad \text{(Eq. 1)}$$

(where K is the number of salient pixels), is equal to the average distance of all pixels of the image, provided that the number of salient points is large enough and uniformly distributed. In accordance herewith, the average distance $\bar{d}_i$ is statistically independent of the image content and depends on the watermark pattern W only.

Figure 7:
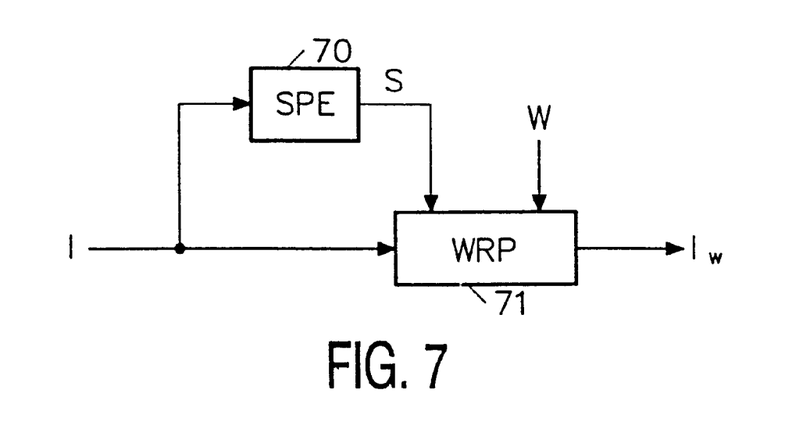
FIG. 7 shows, schematically, the more general embodiment of the arrangement for embedding a watermark in an image.

FIG. 7 shows, schematically, the corresponding embodiment of the arrangement for embedding the watermark W in an image I. The arrangement comprises a salient point extraction module 70 and a warping module 71. They are identical to modules 10 and 12, respectively in FIG. 1.

Figure 8:
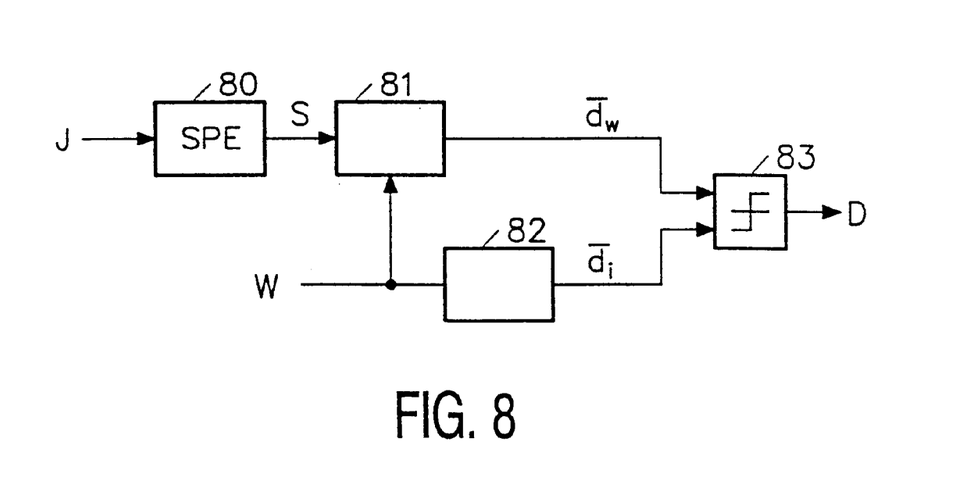
FIG. 8 shows, schematically, the more general embodiment of the arrangement for detecting a watermark in a suspect image.

FIG. 8 shows, schematically, the corresponding embodiment of the arrangement for detecting the watermark W in a suspect image J. The arrangement comprises a salient point extraction module 80, a circuit 81 for determining the average distance $\bar{d}_w$ of the salient points of the possibly watermarked image J in accordance with $$\bar{d}_w = \frac{1}{K} \sum_{k \in S} d_{w,k},$$

a circuit 82 for determining the average distance $\bar{d}_1$ of the salient points of the unwatermarked image in accordance with Eq. 1 above, and a detection circuit 83. It will be appreciated that the detection circuit 83 concludes that the suspect image J is watermarked (D=1) if the average distance $\bar{d}_w$ is significantly smaller than the average distance $\bar{d}_i$, otherwise it is not (D=0).

The watermarking method in accordance with the invention has low visual impact. Since the line pattern is dense with respect to the image, one can always find sufficiently many candidates of significant pixels that can be warped without affecting the image too much. Dedicated significant point location and sophisticated warping further help to reduce visual artifacts.

The invention further supports sufficient variation of watermarks by having a large library of line patterns to look for. Not only can it easily be verified whether one given watermark is embedded, but due to its relative computational simplicity, it is possible to check for many different line patterns.

As regards speed of detection, a complexity analysis of the detection method will now be given. For each watermark to be tested, the K most significant points of an image with resolution $n^2$ are determined. This operation requires $O(n^2)$ time. Once these K points of an image have been selected, matching them with many different watermark line patterns is computationally a considerably simpler task than computing correlations between the complete image and equally many watermark patterns as taught by the prior art. Namely, for an image of size n*n pixels, computing a correlation requires $O(n^2)$ time. Note that a dense line pattern contains $O(n)$ lines, and finding the closest line to a given query point requires $O(\log n)$, when preprocessing of the line pattern is allowed. Once the K points have been found, the time complexity per tested watermark becomes $O(k \log n)$.

The invention further provides embedding more bits. Different line patterns can be used in different areas of the picture. Different line patterns (each of lower density) can be combined. It is also possible to apply different significant point extraction methods. For example, one method is used for extracting local maxima only, one method is used for extracting upper-right corners only, etc.

The embedded watermark is hard to remove by an attacker. It is not easy for an attacker to determine the specific line pattern that forms the watermark. Even when an attacker has a good guess of the pattern, it is still not straightforward to remove the watermark because the attacker will have to apply warping as well, which is more complicated than simply subtracting a noise pattern.

The method is robust because the significant point extraction can be implemented such that transformations that sufficiently preserve the quality or the essentials of an image (such as compression, noise addition, or color changes) will leave the locations of the most significant pixels intact. With regards to scaling and geometric transformations, it should be noted that matching scaled or rotated sets of points with scaled or rotated line patterns is a computationally easier task than computing correlations.

It is to be noted that the pattern onto which significant pixels are warped need not necessarily be a line pattern and its vicinity. Arbitrary dense point patterns may also be used.

Thus, a digital image signal is watermarked by locally changing geometric features of the image. The watermark consists of a pseudo-random, dense subset of image pixels, e.g., a pattern of lines (20). A number of significant image pixels (21,22,23), i.e., pixels which give the highest response to a predetermined processing operation, is determined and then moved (24) to the vicinity (δ) of the line pattern. As a result of this "warping", the majority of significant image pixels (21,22) is eventually located within the vicinity of the line pattern. At the receiver end, the most significant pixels of an input image are again determined. The image is a watermarked image if a statistically high percentage lies within the vicinity of the line pattern.

Figure 9:
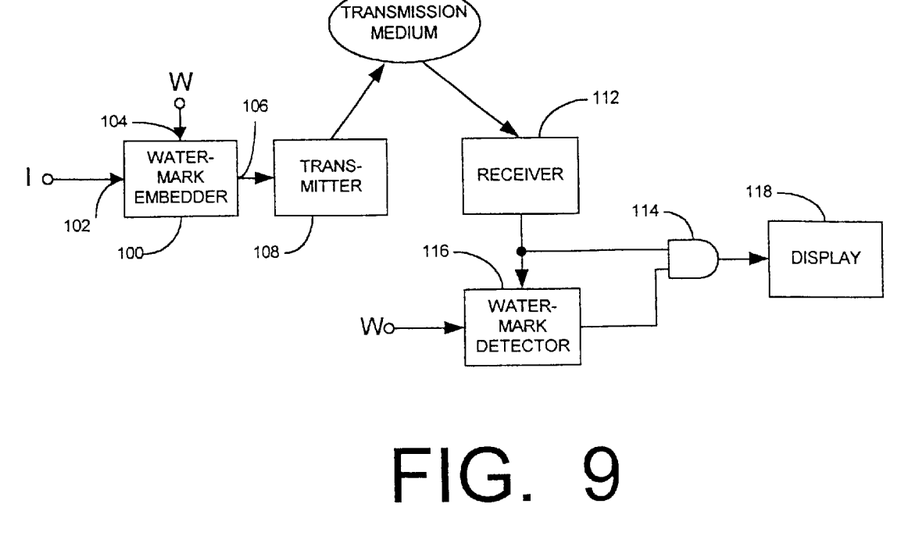
FIG. 9 shows a block diagram of an arrangement for transmitting and receiving an image containing a watermark.

FIG. 9 shows an arrangement for transmitting and receiving an image containing a watermark. A watermark embedder 100 receives and image signal I on input 102 and a watermark W on input 104. The watermark embedder 100 is constructed in accordance with any of the embodiments of FIG. 1, 5 or 7. The image containing the watermark $I_W$ is supplied at output 106 to a transmitter 108. The transmitter 108 then converts the watermarked image $I_W$ into a transmission signal $T_S$ and applies transmission signal $T_S$ to a transmission medium 110. The transmitter 108 and the transmission medium may take any known form, for example, in the case of a broadcast, the transmitter 108 modulates the watermarked image $I_W$ onto a radio frequency (RF) carrier wave, and the transmission medium 110 may comprise airwaves containing the radio waves, or a cable carrying the radio waves. Alternatively, it is known to supply digital signals via the Internet. As such, the transmitter 108 may comprises means for transmitting the watermarked image $I_W$ over the transmission medium 110 comprising the Internet.

A receiver 112 coupled to the transmission medium 110 then receives the transmission signal T$_S$ and applies the image signal J to one input of an AND-gate 114. A watermark detector 116 is connected to also receive the image signal J from the receiver 112 as well as the watermark W. If a watermark is not detected, the watermark detector 116 applies a logic "1" signal to the AND-gate 114 which allows the image signal to be applied to a display device 116. If the watermark is detected and if the user is not authorized to receive the image signal, the watermark detector 116 sends a logic "0" signal to the AND-gate 114 which blocks the application of the image signal J to the display device 118. Finally, if the user is authorized, the watermark detector 116 applies the logic "1" signal to the AND-gate 114 which, again, applies the image signal J to the display device 118.

Figure 10:
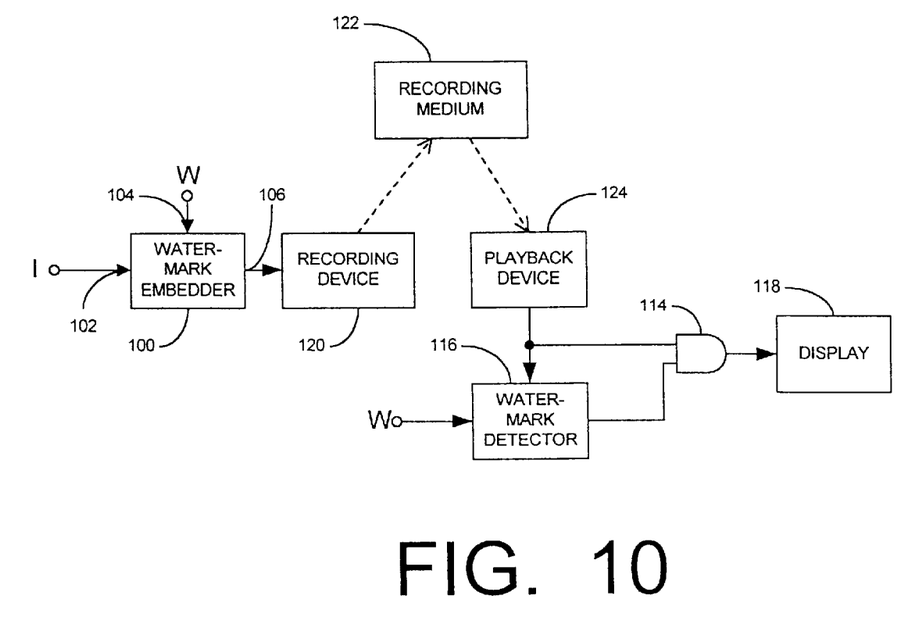
FIG. 10 shows a block diagram of an arrangement for recording on a storage medium and for playing back from the storage medium an image containing a watermark.

FIG. 10 shows a block diagram of an arrangement for recording and playing back a watermarked image signal IW onto and from a record carrier. This arrangement is substantially similar to that shown in FIG. 9, except that the watermarked image signal IW at the output 106 of the watermark embedder 100 is applied to a recording device 120. The recording device 120 then converts the watermarked image signal IW into a recording signal RS and records the recording signal RS onto the record carrier 122. The recording device 120 and the record carrier 122 may take any known form. For example, in the case of the record carrier 122 being a magnetic video tape, the recording device 120 may take the form of a helical scan video tape recorder. Alternatively, the record carrier 122 may be an optical disk, for example, CD-ROM, CD-R, DVD, DVD-ROM, DVD-R/W, etc. In that event, the recording device 120 would take the form of an optical disk recorder.

In order to play back the recording signal RS, the record carrier 122 is inserted into a playback device 124 which processes the recording signal RS and generates an image signal J. As with the embodiment of FIG. 9, the playback device 124 applies the image signal J to one input of an AND-gate 114. A watermark detector 116 is connected to also receive the image signal J from the playback device 124 as well as the watermark W. If a watermark is not detected, the watermark detector 116 applies a logic "1" signal to the AND-gate 114 which allows the image signal J to be applied to a display device 116. If the watermark is detected and if the user is not authorized to playback the image signal, the watermark detector 116 sends a logic "0" signal to the AND-gate 114 which blocks the application of the image signal J to the display device 118. Finally, if the user is authorized, the watermark detector 116 applies the logic "1" signal to the AND-gate 114 which, again, applies the image signal J to the display device 118.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. An image signal representing an image with an embedded watermark in the form of a predetermined pattern of pixels, wherein the average distance of a given number of most significant image pixels to the watermark pattern is significantly smaller than the average distance of all image pixels to the watermark pattern.

2. The image signal as claimed in claim 1, wherein the number of most significant pixels having a distance to the watermark pattern which is smaller than a predetermined threshold is a significantly high percentage of the number of most significant image pixels.

3. A record carrier having an image signal recorded thereon, said image signal representing an image with an embedded watermark in the form of a predetermined pattern of pixels, wherein the average distance of a given number of most significant image pixels to the watermark pattern is significantly smaller than the average distance of all image pixels to the watermark pattern.

4. The record carrier as claimed in claim 3, wherein the number of most significant pixels having a distance to the watermark pattern which is smaller than a predetermined threshold is a significantly high percentage of the number of most significant image pixels.

5. The record carrier as claimed in claim 3, wherein said record carrier is magnetic video tape.

6. The record carrier as claimed in claim 3, wherein said record carrier is an optical disk.

7. A method of embedding a watermark in an image and for transmitting said watermarked image, comprising the steps:

embedding a watermark in an image, including the sub-steps:
identifying a given number of most significant image pixels;
defining a watermark in the form of a pattern of pixels; and
locally warping the image so as to move a significant percentage of the most significant image pixels to the vicinity of the watermark pattern;
generating a transmission signal from said locally warped image; and
applying said transmission signal to a transmission medium.

8. The method as claimed in claim 7, wherein said transmission medium is airwaves, said generating step comprises modulating said locally warped image onto a carrier wave, and said applying step comprises transmitting said modulated carrier wave over said airwaves.

9. The method as claimed in claim 7, wherein said transmission medium is the Internet.

10. A method for displaying a watermarked image signal retrieved from a transmission medium, wherein said watermarked image signal has been generated by identifying a given number of most significant image pixels, defining a watermark in the form of a pattern of pixels, and locally warping the image so as to move a significant percentage of the most significant image pixels to the vicinity of the watermark pattern, said method comprising the steps:

retrieving a transmission signal from said transmission medium;
converting said transmission signal into an image signal;
detecting a watermark in said image signal, including the sub-steps:
identifying a given number of most significant image pixels;
determining the distances of said most significant image pixels to the watermark pattern; and
generating a detection signal indicating that said predetermined watermark is embedded in the suspect image, if the average distance of said most significant pixels to the watermark pattern is significantly smaller than the average distance of all image pixels to the watermark pattern; and
selectively displaying said image signal in dependence on said detection signal.

11. An apparatus for embedding a watermark in an image and for transmitting and receiving said watermarked image, comprising:
an arrangement for embedding a watermark in an image comprising:
means for identifying a given number of most significant image pixels;
means for defining a watermark in the form of a pattern of pixels; and
means for locally warping the image so as to move a significant percentage of the most significant image pixels to the vicinity of the watermark pattern;
means for generating a transmission signal from said locally warped image; and
means for applying said transmission signal to a transmission medium.

12. The apparatus as claimed in claim 11, wherein said transmission medium is airwaves, said generating means comprises means for modulating said locally warped image onto a carrier wave, and said applying means comprises means for transmitting said modulated carrier wave over said airwaves.

13. The apparatus as claimed in claim 11, wherein said transmission medium is the Internet.

14. An apparatus for displaying a watermarked image signal retrieved from a transmission medium, wherein said watermarked image signal has been generated by identifying a given number of most significant image pixels, defining a watermark in the form of a pattern of pixels, and locally warping the image so as to move a significant percentage of the most significant image pixels to the vicinity of the watermark pattern, said apparatus comprising:
means for retrieving a transmission signal from said transmission medium;
means for converting said transmission signal into an image signal;
means for detecting a watermark in said image signal, said detecting means comprising:
means for identifying a given number of most significant image pixels;
means for determining the distances of said most significant image pixels to the watermark pattern; and
means for generating a detection signal indicating that said predetermined watermark is embedded in the suspect image, if the average distance of said most significant pixels to the watermark pattern is significantly smaller than the average distance of all image pixels to the watermark pattern; and
means for selectively displaying said image signal in dependence on said detection signal.

15. A method of embedding a watermark in an image and for recording said watermarked image on a record carrier, comprising the steps:
embedding a watermark in an image, including the sub-steps:
identifying a given number of most significant image pixels;
defining a watermark in the form of a pattern of pixels; and
locally warping the image so as to move a significant percentage of the most significant image pixels to the vicinity of the watermark pattern;
generating a recording signal from said locally warped image; and
recording said recording signal on a record carrier.

16. The method as claimed in claim 15, wherein said record carrier is a magnetic tape.

17. The method as claimed in claim 15, wherein said record carrier is an optical disk.

18. A method for playing back and displaying a watermarked image signal recorded on a record carrier, wherein said watermarked image signal has been generated by identifying a given number of most significant image pixels, defining a watermark in the form of a pattern of pixels, and locally warping the image so as to move a significant percentage of the most significant image pixels to the vicinity of the watermark pattern, said method comprising the steps:
playing back a recording signal from said record carrier;
converting said recording signal into an image signal;
detecting a watermark in said image signal, including the sub-steps:
identifying a given number of most significant image pixels;
determining the distances of said most significant image pixels to the watermark pattern; and
generating a detection signal indicating that said predetermined watermark is embedded in the suspect image, if the average distance of said most significant pixels to the watermark pattern is significantly smaller than the average distance of all image pixels to the watermark pattern; and
selectively displaying said image signal in dependence on said detection signal.

19. An apparatus for embedding a watermark in an image and for recording said watermarked image on a record carrier, comprising:
means for embedding a watermark in an image comprising:
means for identifying a given number of most significant image pixels;
means for defining a watermark in the form of a pattern of pixels; and
means for locally warping the image so as to move a significant percentage of the most significant image pixels to the vicinity of the watermark pattern;
means for generating a recording signal from said locally warped image; and
means for recording said recording signal on a record carrier.

20. An apparatus for playing back and displaying a watermarked image signal recorded on a record carrier, wherein said watermarked image signal has been generated by identifying a given number of most significant image pixels, defining a watermark in the form of a pattern of pixels, and locally warping the image so as to move a significant percentage of the most significant image pixels to the vicinity of the watermark pattern, said apparatus:
means for playing back a recording signal from said record carrier;
means for converting said recording signal into an image signal;
means for detecting a watermark in said image signal comprising:
means for identifying a given number of most significant image pixels;
means for determining the distances of said most significant image pixels to the watermark pattern; and
means for generating a detection signal indicating that said predetermined watermark is embedded in the suspect image, if the average distance of said most significant pixels to the watermark pattern is significantly smaller than the average distance of all image pixels to the watermark pattern; and means for selectively displaying said image signal in dependence on said detection signal.

* * * * *